United States Patent
Shibata

(10) Patent No.: US 12,539,837 B2
(45) Date of Patent: Feb. 3, 2026

(54) VEHICLE BRAKING APPARATUS

(71) Applicant: DENSO CORPORATION, Kariya (JP)

(72) Inventor: Yusuke Shibata, Kariya (JP)

(73) Assignee: DENSO CORPORATION, Kariya (JP)

( * ) Notice: Subject to any disclaimer, the term of this patent is extended or adjusted under 35 U.S.C. 154(b) by 51 days.

(21) Appl. No.: 18/734,553

(22) Filed: Jun. 5, 2024

(65) Prior Publication Data

US 2024/0317201 A1 Sep. 26, 2024

Related U.S. Application Data

(63) Continuation of application No. PCT/JP2022/045090, filed on Dec. 7, 2022.

(30) Foreign Application Priority Data

Dec. 8, 2021 (JP) ................. 2021-199179

(51) Int. Cl.
| | |
|---|---|
| B60T 13/74 | (2006.01) |
| B60T 7/10 | (2006.01) |
| B60T 8/17 | (2006.01) |
| B60T 8/172 | (2006.01) |

(Continued)

(52) U.S. Cl.
CPC ............ B60T 13/741 (2013.01); B60T 7/102 (2013.01); B60T 8/172 (2013.01); B60T 8/17616 (2013.01); B60T 8/1766 (2013.01)

(58) Field of Classification Search
CPC . B60T 7/102; B60T 8/172; B60T 8/32; B60T 8/17; B60T 8/17616; B60T 13/74; B60T 13/741; H02P 29/62; B60W 30/18181; B60K 26/02; B60K 26/029; H05K 7/14322; F16D 2127/06;

(Continued)

(56) References Cited

U.S. PATENT DOCUMENTS

| 6,851,765 B1 * | 2/2005 | Disser .................. B60T 13/741 303/20 |
| 2004/0026989 A1 * | 2/2004 | Suzuki .................. B60T 13/741 303/20 |

(Continued)

FOREIGN PATENT DOCUMENTS

WO 2023/100658 A 8/2023

*Primary Examiner* — Hai H Huynh
*Assistant Examiner* — Johnny H Hoang
(74) *Attorney, Agent, or Firm* — Maschoff Brennan

(57) ABSTRACT

A vehicle braking apparatus is adapted to a vehicle in which electric brakes are separately provided for wheels, and the electric brakes separately exert braking forces on the wheels. A braking force controller controls the braking forces separately exerted by the electric brakes. A first pair of electric brakes are provided for a front-left wheel and a front-right wheel, and a second pair of electric brakes are provided for a rear-left wheel and a rear-right wheel. At least one of the first pair of electric brakes or the second pair of electric brakes are multiphase electric brakes, and each of the multiphase electric brakes includes a multiphase motor having three or more phases. The braking force controller executes an up-down process to prevent a current from being concentrated on a particular phase of the multiphase motor, except when the vehicle satisfies a predetermined exemption condition.

12 Claims, 16 Drawing Sheets

(51) Int. Cl.
*B60T 8/1761* (2006.01)
*B60T 8/1766* (2006.01)

(58) Field of Classification Search
CPC ............. F16D 2121/24; F16D 2125/40; F16D 2125/36; F16D 2129/08
USPC .............................. 701/70–92; 446/454, 456
See application file for complete search history.

(56) References Cited

U.S. PATENT DOCUMENTS

| | | | |
|---|---|---|---|
| 2008/0091326 A1* | 4/2008 | Watanabe | F16D 65/18 |
| | | | 303/20 |
| 2017/0072931 A1 | 3/2017 | Masuda | |
| 2019/0199260 A1* | 6/2019 | Taniguchi | H02P 21/06 |
| 2021/0276427 A1* | 9/2021 | Yamamoto | B60L 7/26 |
| 2021/0362695 A1* | 11/2021 | Sekiya | B60T 7/102 |

* cited by examiner (FIXED)

VEHICLE BRAKING APPARATUS

CROSS REFERENCE TO RELATED APPLICATIONS

The present application is a continuation application of International Patent Application No. PCT/JP2022/045090 filed on Dec. 7, 2022, which designated the U.S. and claims the benefit of priority from Japanese Patent Application No. 2021-199179 filed on Dec. 8, 2021. The entire disclosures of all of the above applications are incorporated herein by reference.

TECHNICAL FIELD

The present disclosure relates to a vehicle braking apparatus.

BACKGROUND

A vehicle braking apparatus may exert braking force by motor energization.

SUMMARY

The present disclosure describes a vehicle braking apparatus adapted to a vehicle, and further descries that the vehicle braking apparatus includes a braking force controller.

BRIEF DESCRIPTION OF DRAWINGS

Objects, features and advantages of the present disclosure will become more apparent from the following detailed description made with reference to the accompanying drawings. In the drawings.

DETAILED DESCRIPTION

Figure 1:
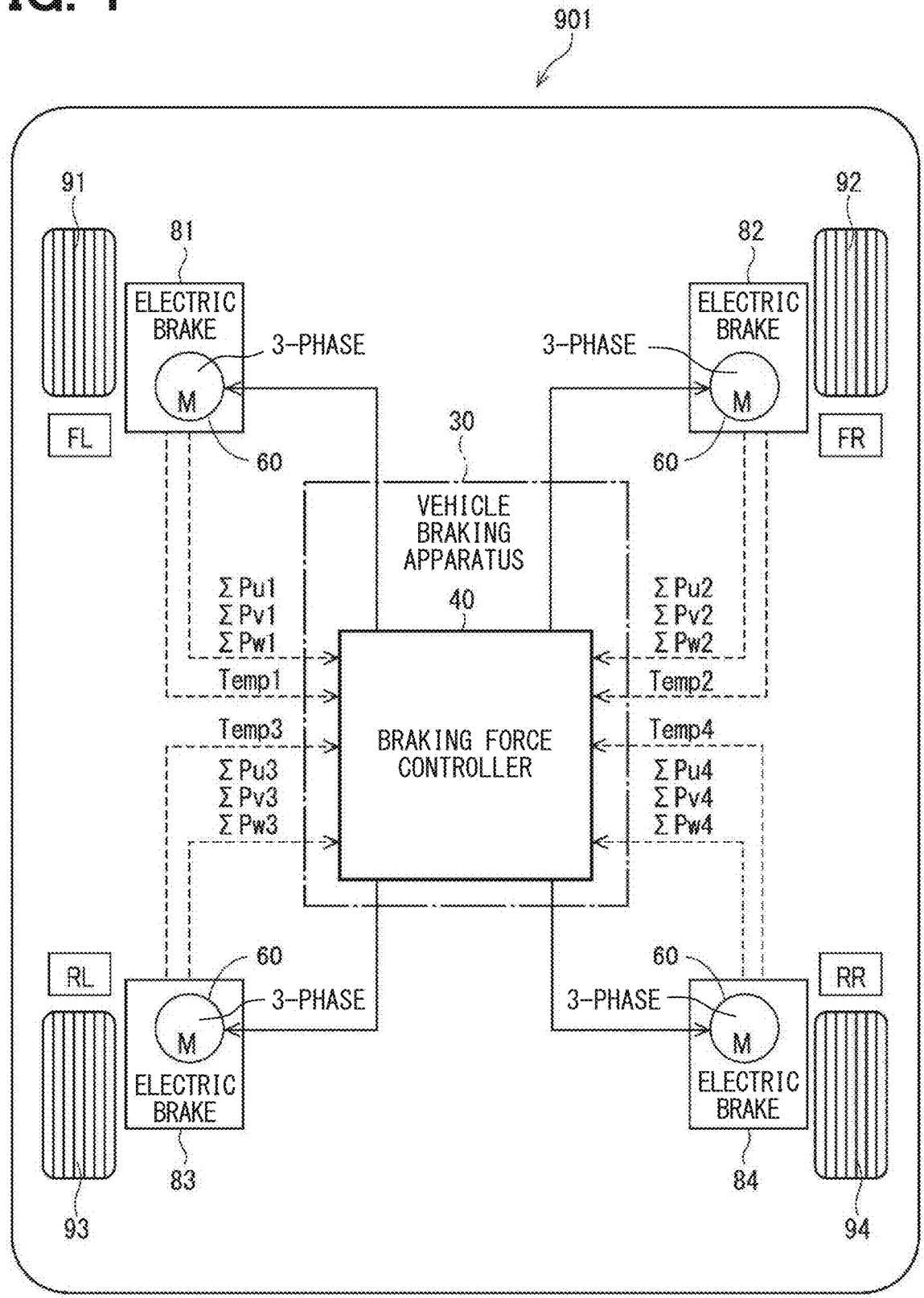
FIG. 1 is a diagram illustrating a configuration of a vehicle with which a vehicle braking apparatus according to each of first to fourth embodiments is equipped.

In a related example, an electric braking apparatus may convert motor torque generated by the motor energization into braking force due to pressing force of a friction pad. The relationship between motor torque and braking force differs between a positive efficiency line when the braking force increases and an inverse efficiency line when the braking force decreases, and has hysteresis characteristics in which the braking force is maintained even if the motor torque changes in a transition from the positive efficiency line to the inverse efficiency line.

According to the related example, a current may be reduced by: generating the braking force slightly higher than target braking force and then reducing the current while maintaining the braking force; and operating the inverse efficiency line to reduce the braking force to the target braking force. However, in order to maintain the braking force, it is necessary to apply an electric current to lock the brake. When the actuator of the electric brake is provided with a multiphase motor, the current may be concentrated on a specific phase and causes uneven heating.

A vehicle braking apparatus according to the present disclosure is adapted to a four-wheel vehicle in which electric brakes are provided for respective wheels. The electric brakes exert braking force on respective wheels. The vehicle braking device includes a braking force controller that controls a braking force exerted by each of the electric brakes.

The electric brakes include a first pair of electric brakes corresponding to front-right and front-left wheels, and further include a second pair of electric brakes corresponding to rear-right and rear-left wheels. At least one pair of the first pair of electric brakes and the second pair of electric brakes are multiphase motors having three or more phases.

Except when the vehicle satisfies a predetermined exemption requirement, an "up-down" process is executed to prevent current from concentrating in a specific phase of the multiphase motor while the braking force controller maintaining the braking force. The up-down process is a process in which the braking force controller increases and decreases a braking force command value for the multiphase electric brake.

For example, in the up-down process, the braking force controller superimposes a sine wave of a braking force command value on a reference value of the braking force command value for the multiphase electric brake. Alternatively, the braking force controller continuously or intermittently superimposes a rectangular wave or a trapezoidal wave on a reference value of the braking force command value. The rectangular wave or the trapezoidal wave alternates between a positive state exceeding the reference value and a negative state below the reference value.

As a result, in the present disclosure, it is possible to prevent heat generation from being concentrated in a specific phase when locking current is applied to maintain the braking force of an electric brake having a multiphase motor.

Hereinafter, a vehicle braking apparatus according to several embodiments of the present disclosure will be described with reference to the drawings. The vehicle braking apparatus according to the present embodiment is adapted to a vehicle in which electric brakes that exert braking forces on corresponding wheels are provided for the respective wheels. The vehicle braking apparatus includes a braking force controller that controls a braking force generated by each of the electric brakes. The following first to fifth embodiments are collectively referred to as a "present embodiment." Among these embodiments, the structures of the electric brakes of the vehicle adopted in the respective first to fourth embodiments are the same. The structure of the electric brake of the vehicle applied to the fifth embodiment is distinct.

(Structure of Electric Brake of Vehicle in First to Fourth Embodiments)

Figure 2:
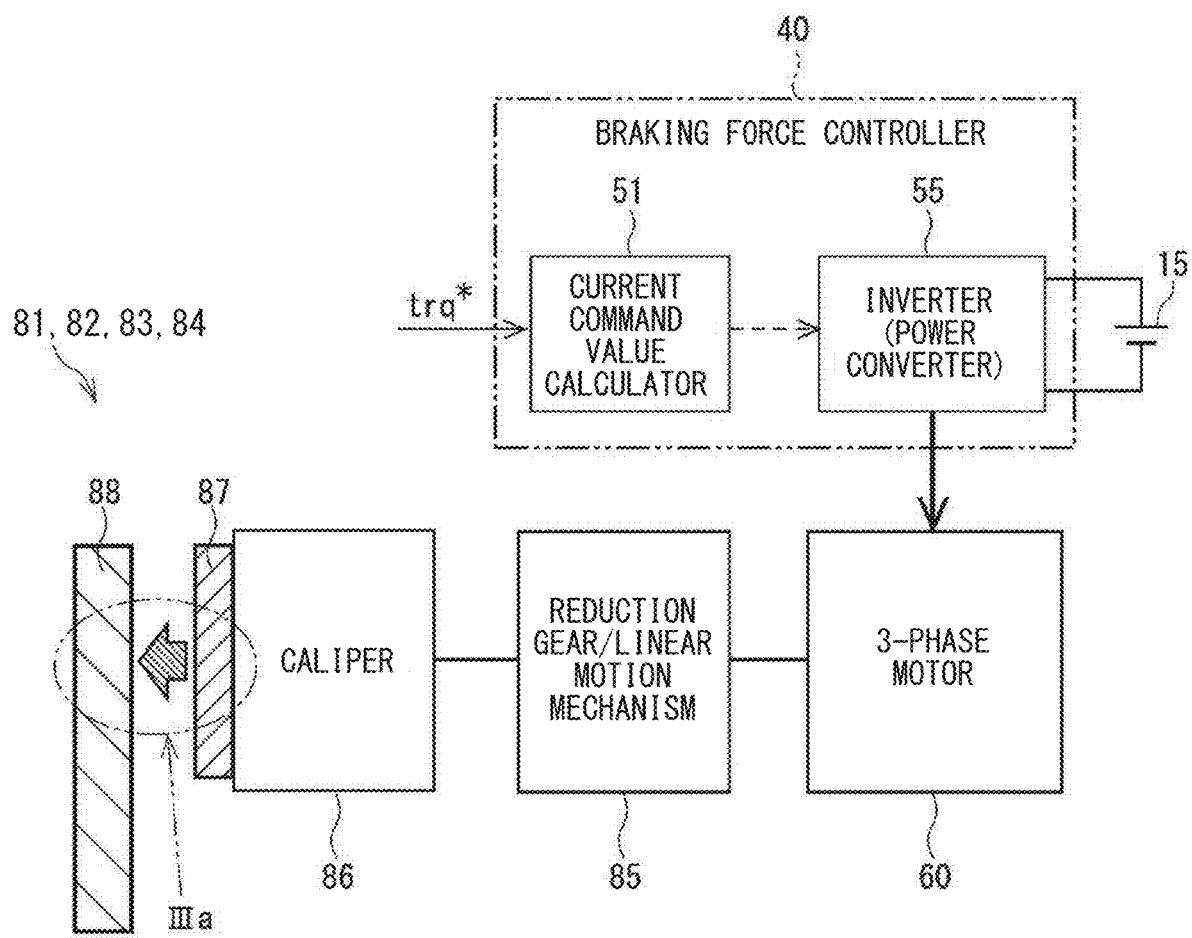
FIG. 2 is a schematic diagram of an electric brake for each wheel.

With reference to FIGS. 1 to 3, the following describes the structure of a vehicle 901 to which a vehicle braking apparatus 30 according to each of the first to fourth embodiments is adapted and the structure of electric brakes 81 to 84. As shown in FIG. 1, the vehicle 901 is a four-wheel vehicle having two rows of left and right pairs of wheels 91, 92, 93, 94 in a front-rear direction. The left and right wheels at the front row may also be noted as "FL" and "FR", respectively. The left and right wheels at the rear row may also be noted as "RL" and "RR", respectively.

The electric brakes 81, 82, 83, 84 are provided for the respective wheels 91, 92, 93, 94. In other words, four electric brakes are provided in this example. Hereinafter, four consecutive reference numerals will be appropriately abbreviated to "wheels 91 to 94" and "electric brakes 81 to 84" on some occasions. The same applies to the symbols "integrated power value $\Sigma P1$ to $\Sigma P4$" and "temperature Temp1 to Temp4" described later.

In the first to fourth embodiments, a pair of electric brakes 81, 82 corresponding to the front left and right wheels 91, 92, and a pair of electric brakes 83, 84 corresponding to the rear left and right wheels 93, 94 are respectively constructed by three-phase motors ("3-phase M" in the drawing) 60 as "multiphase motors." In the present disclosure, the three-phase motor 60 according to the present embodiment is a permanent magnet-type brushless motor.

An electric brake composed of a multiphase motor is called a "multiphase electric brake." In the first to fourth embodiments, all of the four electric brakes 81 to 84 are three-phase electric brakes. Also, the three-phase motors 60 corresponding to the electric brakes 81 to 84 have the same configuration and function, and so a single reference numeral "60" is used for each of them. In the following description, the three-phase motor 60 will be abbreviated as simply "motor 60" where appropriate.

The vehicle braking apparatus 30 includes a braking force controller 40. The braking force controller 40 controls the braking force exerted by each electric brakes 81 to 84 on the corresponding wheels 91 to 94. The braking force controller 40 controls the braking force exerted by the electric brakes 81 to 84 by controlling a current flowing to each motor 60 in accordance with the braking force distribution to each wheel.

The braking force controller 40 may acquire at least one of the integrated power values ($\Sigma Pu1$, $\Sigma Pv1$, $\Sigma Pw1$) to ($\Sigma Pu4$, $\Sigma Pv4$, $\Sigma Pw4$) for each phase of the three-phase motor 60 corresponding to each electric brake 81 to 84, or the motor temperatures Temp1 to Temp4. Hereinafter, the integrated power values $\Sigma Pu1$, $\Sigma Pv1$, and $\Sigma Pw1$ for each phase will be collectively referred to as "$\Sigma Puvw1$." In addition, in a comprehensive explanation of each of the electric brakes 81 to 84, the "1-4" will be omitted and they will be written as "integrated power value $\Sigma Puvw$" and "motor temperature Temp."

The motor temperature Temp is detected by, for example, a temperature sensor. Alternatively, the motor temperature Temp may be calculated by estimating a temperature rise from Joule heat caused by energizing the three-phase motor 60 and adding the estimated temperature rise to the outside air temperature. The integrated power value $\Sigma Puvw$ of the motor 60 and the motor temperature Temp have a positive correlation. The integrated power value $\Sigma Puvw$ and the motor temperature Temp will be described later in the explanation of start processing, mode switching, and application exception (exemption). If these conditions are not used, the braking force controller 40 does not need to acquire the integrated power value $\Sigma Puvw$ or the motor temperature Temp.

FIG. 2 shows a schematic configuration of the electric brakes 81 to 84 for respective wheels. The braking force controller 40 mainly includes an inverter 55 and a current command value calculator 51, as components for controlling the three-phase motor 60. The inverter 55 converts direct current (DC) power provided from a battery 15, and supplies alternating current (AC) power to each phase of the three-phase motor 60. The current command value calculator 51 calculates a current command value according to the command torque trq* for a current to be supplied to the three-phase motor 60.

The output torque of the motor 60 operates a pad 87 of a caliper 86 via a reduction gear/linear motion mechanism 85. The pad 87 moves and presses against the disks 88 of each wheel 91 to 94 to generate a braking force through friction. Furthermore, the pad 87 separates from the disk 88, and the braking force is released.

Figure 3A:
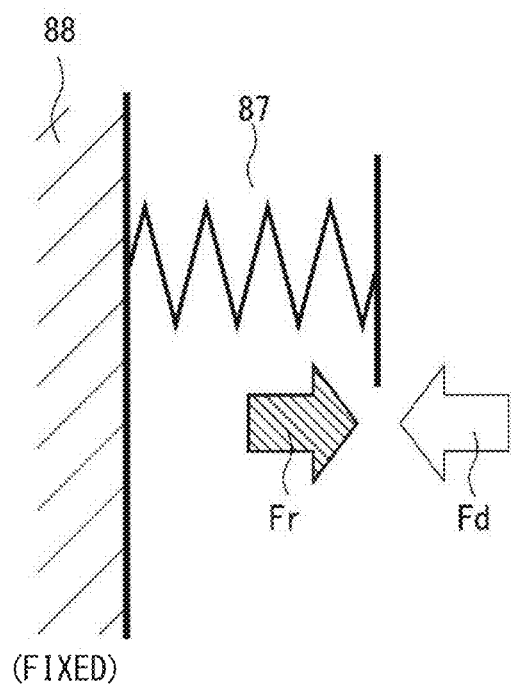
FIG. 3A is a schematic diagram of an electric brake pad.
Figure 3B:
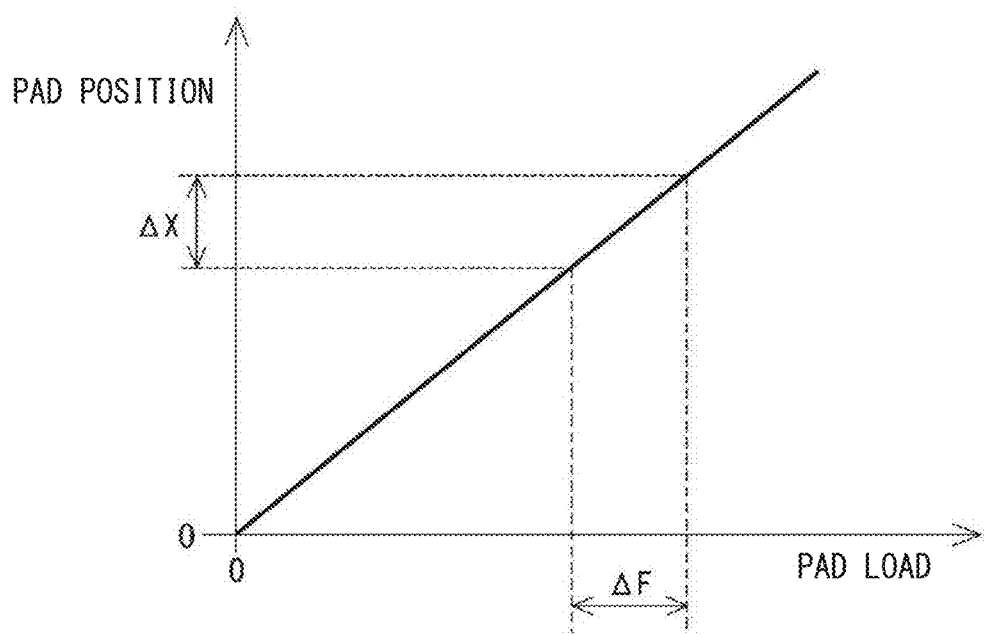
FIG. 3B is a characteristic diagram of a pad load and a pad position.

With reference to FIGS. 3A, 3B, the characteristics of the pad 87 of the electric brake 81-81 shown in part IIIa of FIG. 2 will be supplemented. As shown in FIG. 3A, the pad 87 has spring-like characteristics, and a pressing force Fd by the linear motion mechanism 85 and a reaction force Fr according to the amount of deformation act in opposite directions. As shown in FIG. 3B, the deformation amount (i.e., pad position) X and the pad load F are approximately proportional. Therefore, if the pad position changes by $\Delta X$ due to a phase change of the motor 60, the pad load changes by $\Delta F$.

In a comparative example, the hysteresis characteristics between the motor torque and the braking force are utilized, making it possible to maintain the braking force while reducing the current from the positive efficiency line to the inverse efficiency line. However, in the process of maintaining the braking force, it is necessary to apply locking current while the rotation of the three-phase motor 60 is stopped, which causes current concentration in a specific phase and results in uneven heating.

In the present embodiment, an attempt is made to prevent current from concentrating in a specific phase of the three-phase motor 60 when the braking force is maintained. According to FIG. 3B, it is possible to vary the desired value of pad load F by changing the braking force command value, which in turn causes the pad position X to vary. This enables the variation of the energization phase of motor 60, i.e., the current in each phase. Conversely, it is also possible to calculate the variation width of the braking force command value from the range of phase angles to be changed.

Based on this point of view, the braking force controller 40 according to the present embodiment executes an "up-down" process to prevent current from concentrating in a specific phase of the three-phase motor when the braking force is maintained. The up-down process is a process in which a braking force command value for the three-phase electric brake is increased or decreased. The following describes a particular configuration of the up-down process in each embodiment.

Figure 4:
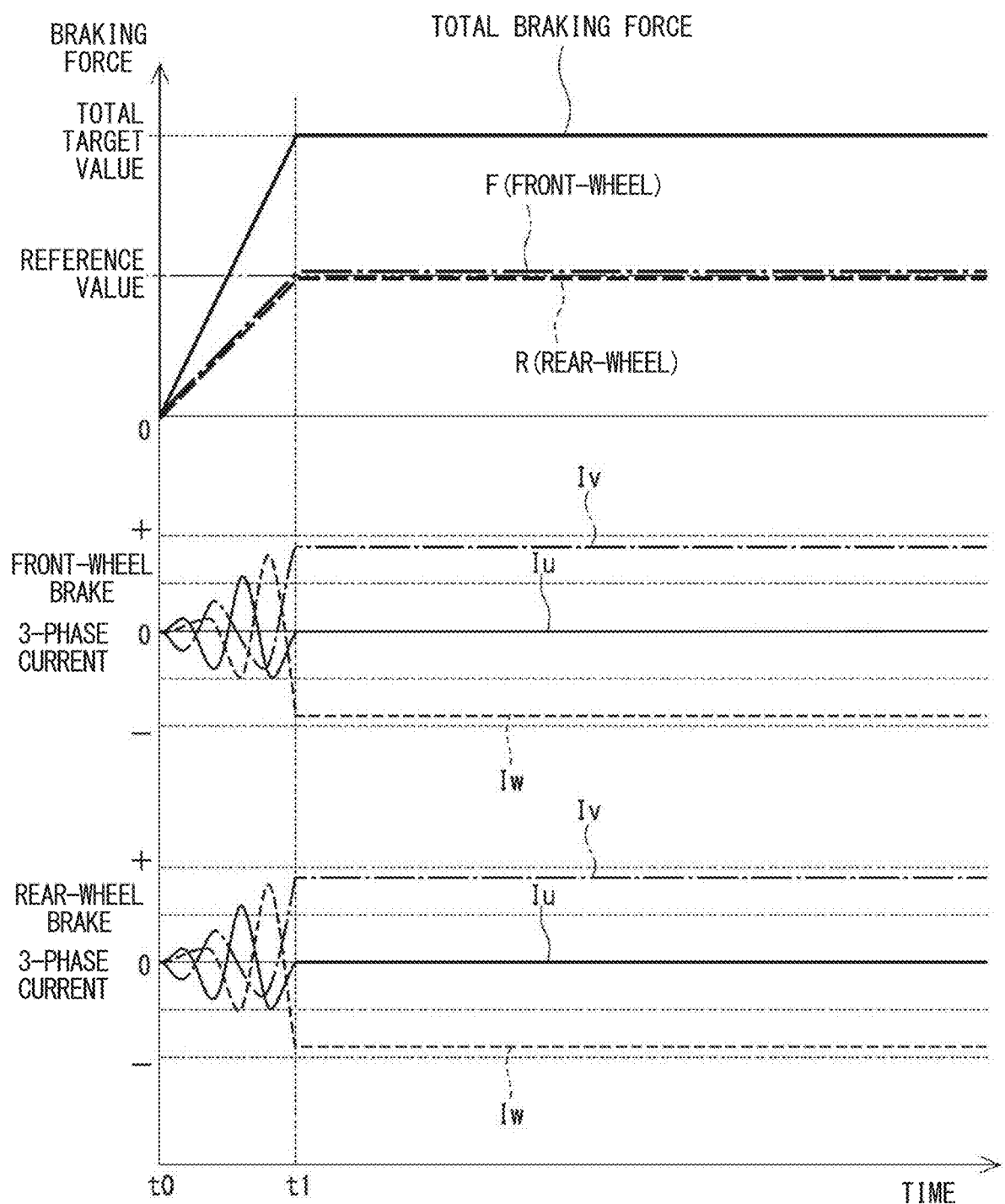
FIG. 4 is a time chart of a braking force command value and respective three-phase currents of a front-wheel brake and a rear-wheel brake in a comparative example.

Prior to describing each embodiment, FIG. 4 shows a braking force command value, and front and rear brake three-phase currents in the comparative example in which the up-down process is not executed. Hereinafter, a pair of electric brakes 81, 82 corresponding to the front left and right wheels 91, 92 will be referred to as "front-wheel brakes 81, 82," and a pair of electric brakes 83, 84 corresponding to the rear left and right wheels 93, 94 will be referred to as "rear-wheel brakes 83, 84." In the drawing, the front-wheel braking force command value is indicated as "F" and the rear-wheel braking force command value is indicated as "R." The "front wheels" in the "front wheel braking force command value" refers to the front left and right wheels 91, 92, and the "rear wheels" in the "rear wheel braking force command value" refers to the rear left and right wheels 93, 94. That is, it means a pair of wheels rather than a single wheel. Moreover, the "braking force" on the vertical axis represents the braking force command value.

The total braking force command value increases from zero to the total target value from time t0 to time t1, and is kept constant after time t1. When the braking force distribution between the front-wheel brakes 81, 82 and the rear-wheel brakes 83, 84 is equal, the front-wheel braking force command value and the rear-wheel braking force command value are both half the total braking force command value. This value is set as the reference value for each of the front-wheel braking force command value and the rear-wheel braking force command value. For convenience of illustration, the one-dotted chain line indicating the front wheel braking force command value and the broken line indicating the rear wheel braking force command value are drawn slightly offset from each other since they would be difficult to distinguish if they overlap.

The time charts of the following embodiments are in the format of FIG. 4 and illustrate the case where the braking force distribution between the front-wheel brakes 81, 82 and the rear-wheel brakes 83, 84 is equal. However, a difference may be provided in the distribution of braking force between the front-wheel brakes 81, 82 and the rear-wheel brakes 83, 84. In this case, the reference value of the front-wheel braking force command value and the reference value of the rear-wheel braking force command value are shown by separate lines.

During an increase in braking force from time t0 to t1, the three-phase currents of the front-wheel brakes 81, 82 and the rear-wheel brakes 83, 84 become sine waves whose amplitude gradually increases. After time t1, the three-phase motor 60 enters a locked energized state, and the three-phase currents of the front-wheel brakes 81, 82 and the rear-wheel brakes 83, 84 become constant values. If this state continues, the current will concentrate on a specific phase and results in uneven heating.

First Embodiment

Figure 5:
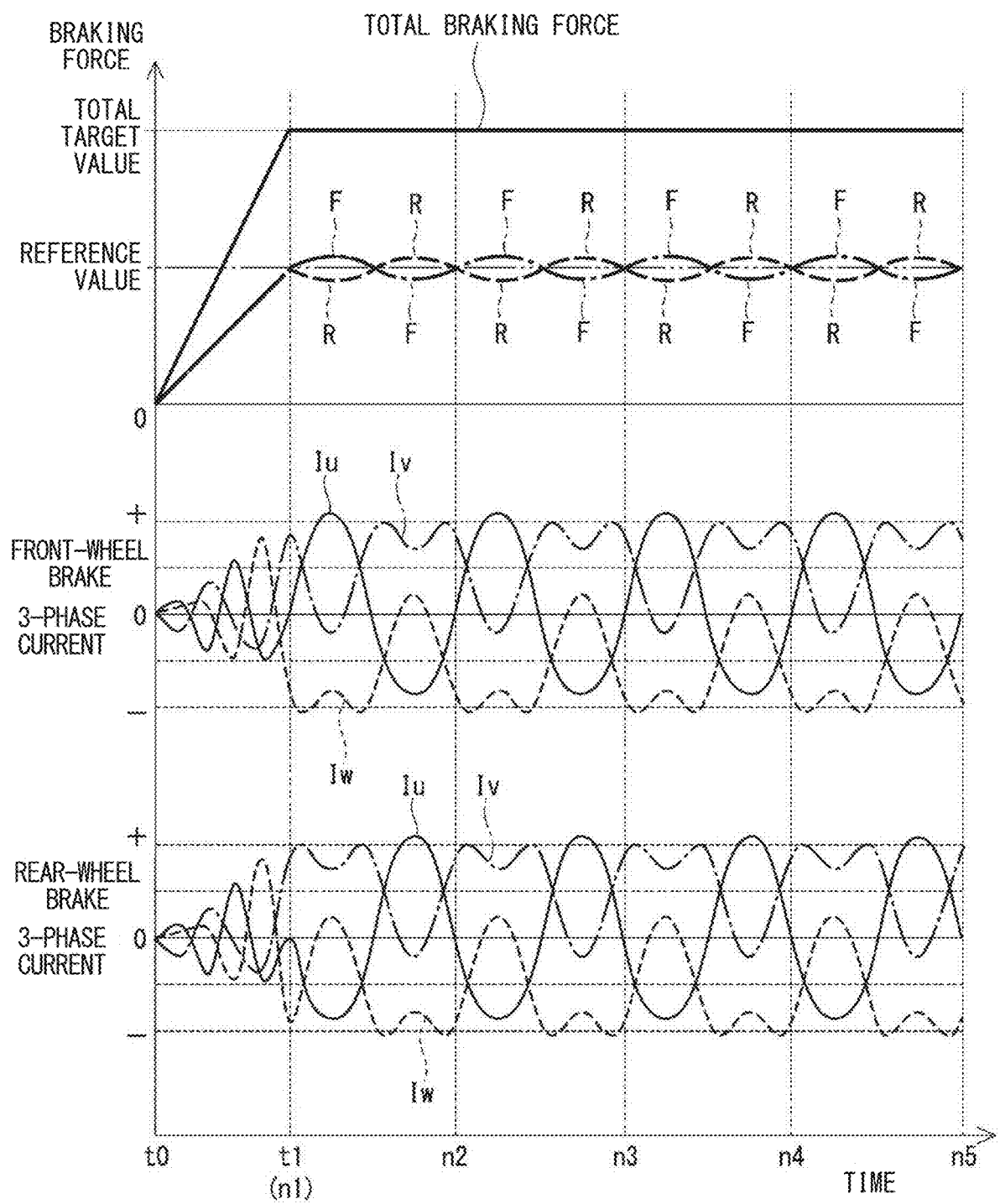
FIG. 5 is a time chart of a braking force command value in an up-down process and three-phase currents of a front-wheel brake and a rear-wheel brake in the first embodiment.

The following describes an up-down process according to the first embodiment with reference to FIG. 5. In the first embodiment, the braking force controller 40 continuously superimposes sine waves having the same period with a half period shift on the respective reference values of the front-wheel braking force command value and the rear-wheel braking force command value. When the value of the sine wave is positive, the braking force command value increases relative to the reference value. When the value of the sine wave is negative, the braking force command value decreases relative to the reference value. Therefore, the braking force command values for the front and rear wheels periodically increase and decrease with respect to the reference values.

Figure 9:
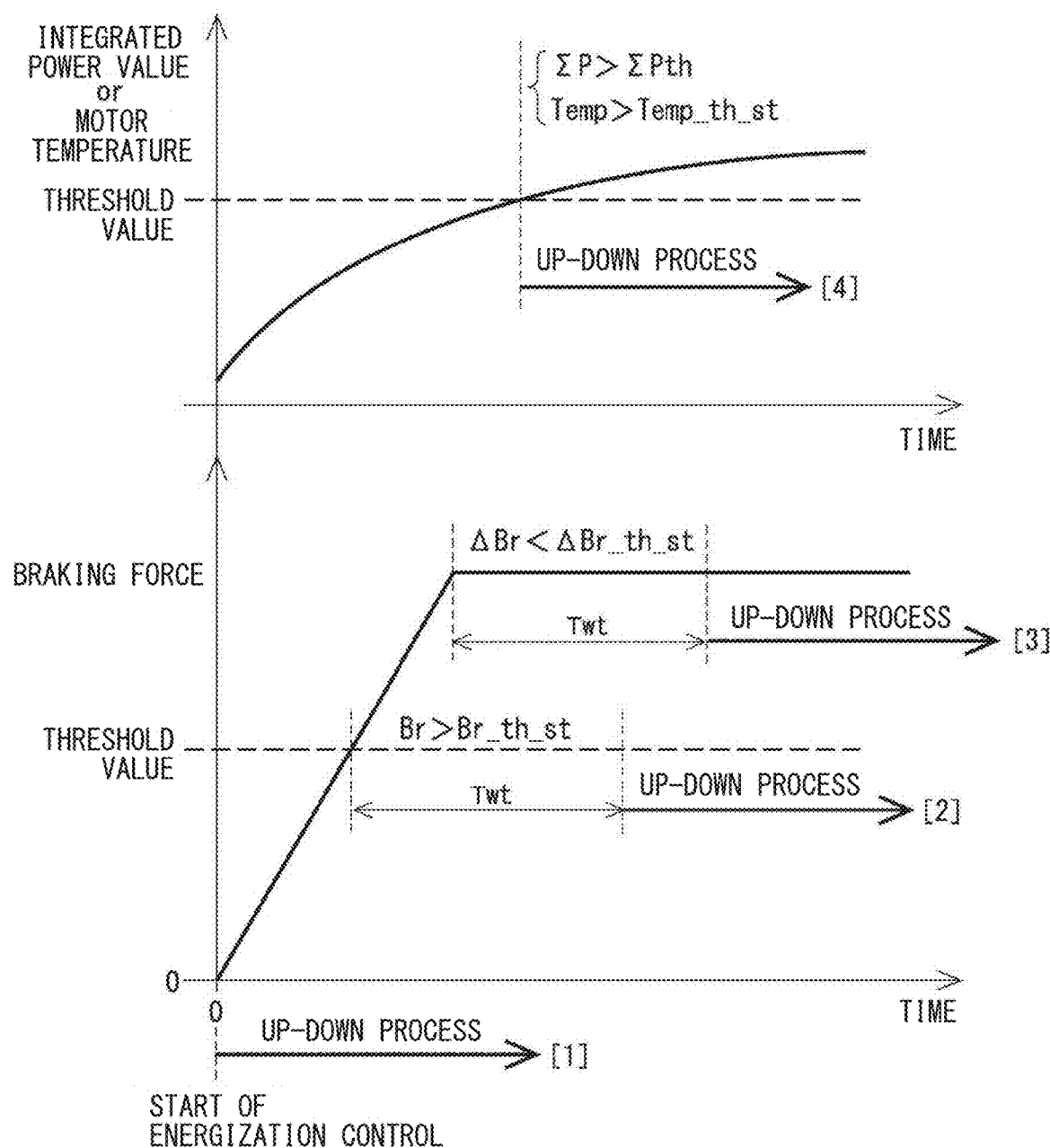
FIG. 9 is a diagram showing an example of start timing of an up-down process.

On the horizontal axis, times corresponding to the starting points (nodes) of one cycle of a sine wave are indicated as n1 to n5. For example, the superposition of a sine wave is started from a starting point n1, which is a time t1 when the braking force command value reaches a certain value. With reference to FIG. 9, the timing at which the superposition of sine waves is started is not limited to the above situation. The timing may also occur before the time t1 or after the time t1.

It may be preferable that the amplitude of the sine wave superimposed on the reference value of the front-wheel braking force command value is equal to the amplitude of the sine wave superimposed on the reference value of the rear-wheel braking force command value. As a result, the sum of the front-wheel braking force command value and the rear-wheel braking force command value is kept constant, and the distribution of braking forces is changed periodically. The amplitude of the sine wave is set to, for example, about 10% of a reference value common to the front and rear wheels. In this case, the braking force command values for the front and rear wheels vary within a range of approximately 90% to 110% of the reference value. Furthermore, when the respective reference values of the braking force command values for the front and rear wheels are different, for example, a value that is a predetermined ratio of the smaller reference value may be set as a sine wave amplitude common to the front and rear wheels.

The three-phase currents of the front wheel brakes 81, 82 and the rear wheel brakes 83, 84 are expressed in the form of a composite function of sine waves. In the first embodiment, the three-phase current is changed continuously, thereby preventing the three-phase motor 60 from being locked. This prevents current from concentrating in a specific phase and causing uneven heat generation.

Second Embodiment

Figure 6:
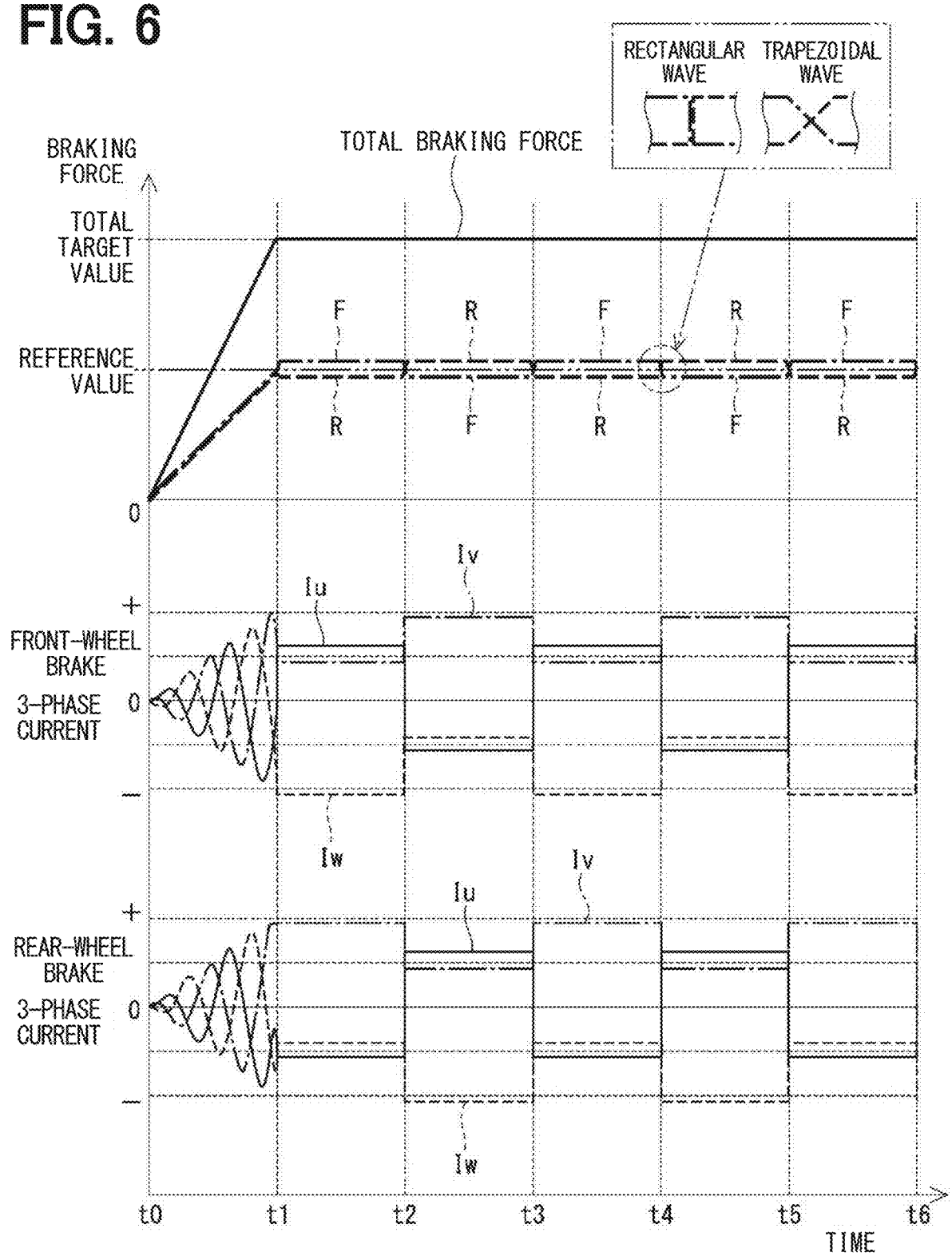
FIG. 6 is a time chart of a braking force command value in an up-down process and three-phase currents of a front-wheel brake and a rear-wheel brake in the second embodiment.

The following describes an up-down process according to the second embodiment with reference to FIG. 6. In the second embodiment, the braking force controller 40 continuously superimposes a rectangular wave or a trapezoidal wave on respective reference values of the front-wheel braking force command value and the rear-wheel braking force command value. The rectangular wave or the trapezoidal wave alternates between a positive state exceeding the reference value and a negative state below the reference value. The positive increment and negative decrement of the braking force command value are set symmetrically with respect to a reference value, for example, at about 10% of the reference value.

In the example shown in FIG. 6, after time t1, the front-wheel braking force command value and the rear-wheel braking force command value are switched periodically at a "predetermined fixed period." The positive or negative state of the front-wheel braking force command value and the rear-wheel braking force command value with respect to the reference value at a certain term is referred to as a "mode." The mode is in a situation where "the front-wheel braking force command value is positive and the rear-wheel braking force command value is negative" at times t1 to t2, t3 to t4 and t5 to t6. The mode is in a situation where "the front-wheel braking force command value is negative and the rear-wheel braking force command value is positive" at times t2 to t3 and t4 to t5.

In this manner, the front-wheel braking force command value and the rear-wheel braking force command value periodically increase and decrease with respect to each reference value. Here, the "predetermined fixed period" is not limited to a period common to all modes, and a different fixed period may be predefined for each mode. Different fixed periods may be determined in advance depending on the time from the start of the up-down process or the number of mode switches. Alternatively, instead of using a "predetermined fixed period," mode switching may be performed using the present value of a parameter as a trigger, as will be described later with reference to FIG. 10.

When the braking force command value changes at the time of mode switching, a waveform that changes abruptly is referred to as a rectangular wave, and a waveform that changes gradually is referred to as a trapezoidal wave. Although it is possible to interpret a rectangular wave as being included in a trapezoidal wave in the broad sense, they are described together as a "square wave or a trapezoidal wave" in the present disclosure. There is essentially no difference in the action of the up-down process between a rectangular wave and a trapezoidal wave.

Furthermore, when the gradual change time of the trapezoidal wave approaches half the mode switching period, the wave appears to be a triangular wave. Such a triangular wave, a sawtooth wave or the like in which only one of the rising edge or the falling edge changes gradually may be included in the trapezoidal wave. In the time charts of FIG. 6 and subsequent drawings, waveforms close to rectangular waves are shown as representative of rectangular waves or trapezoidal waves.

In the second embodiment, the three-phase current is changed in a step manner each time the mode is switched, thereby preventing the three-phase motor 60 from being locked. This prevents current from concentrating on a specific phase and causing uneven heat generation, as in the first embodiment. Furthermore, particularly in the case of a rectangular wave, a constant braking force command value is output during the same term, so that the calculation load on the braking force controller 40 is reduced. A modified example of the second embodiment and third and fourth embodiments which apply the second embodiment will be described after the algorithm for the up-down process.

(Algorithm of Up-down Process)

Figure 7:
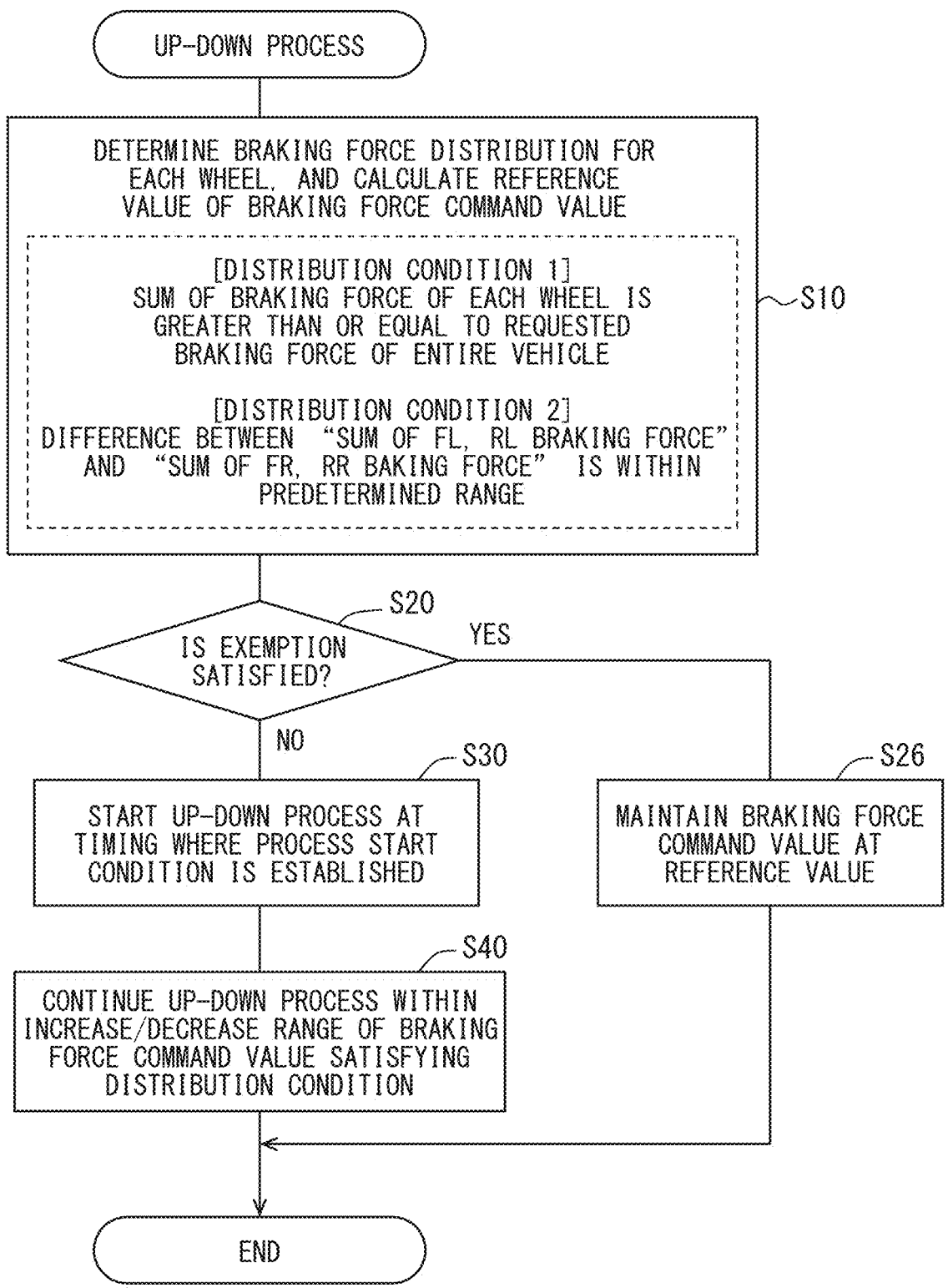
FIG. 7 is an overall flowchart of the up-down process.
Figure 8:
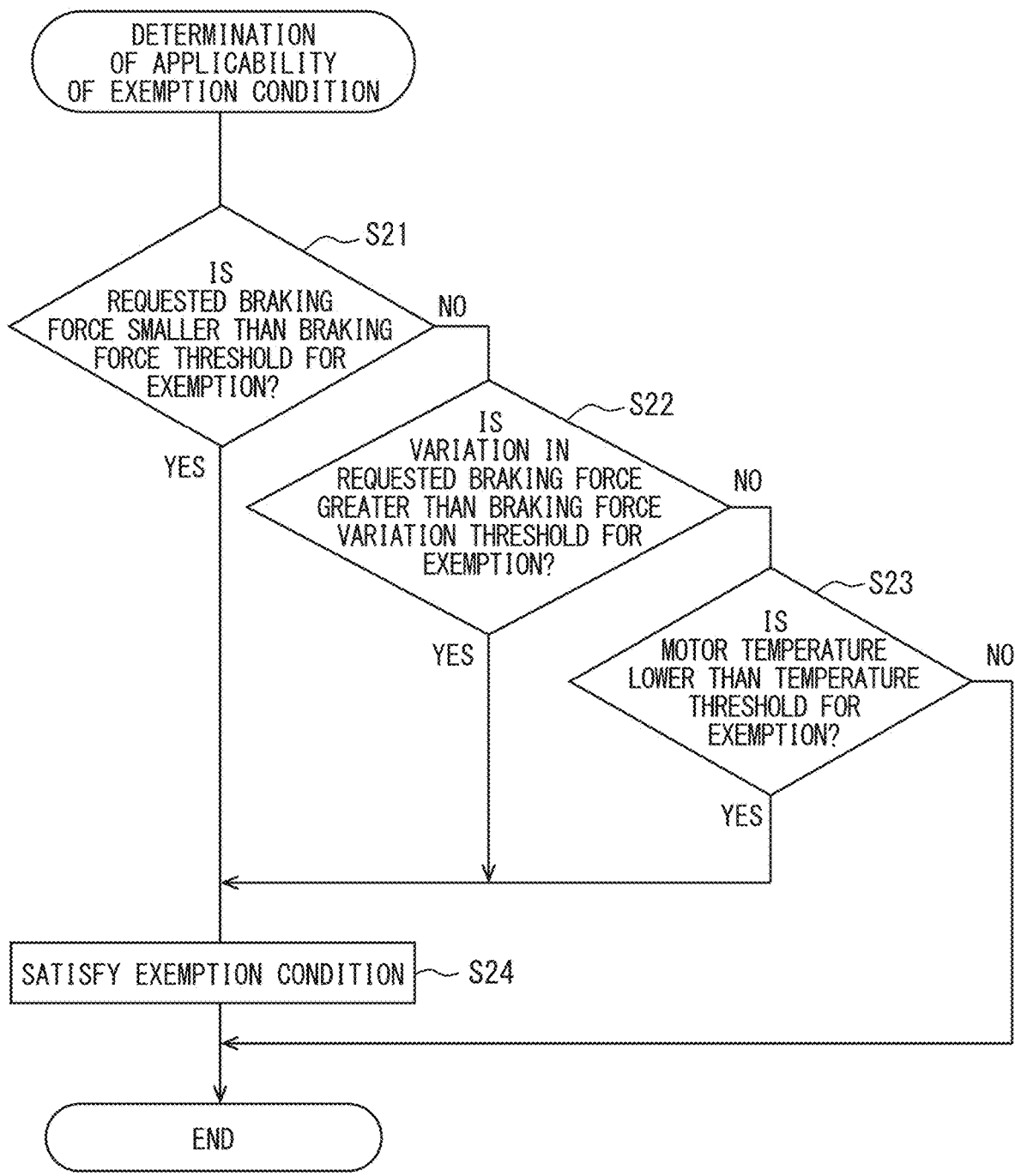
FIG. 8 is a flowchart of determination of whether an exemption condition is satisfied.

The following describes the algorithm of the up-down process with reference to FIGS. 7 to 10. FIGS. 7 to 9 are common to the first and second embodiments. The mode switching flowchart shown in FIG. 10 applies to the second embodiment.

The flowchart of FIG. 7 shows the entire up-down process. In the following flowchart, a symbol S indicates a step. In S10, the braking force controller 40 determines the braking force distribution to the wheels 91 to 94 based on the required braking force so as to satisfy the following distribution conditions. Then, the braking force controller 40 calculates reference values for the front-wheel braking force command value and the rear-wheel braking force command value.

The distribution condition 1 is a condition in which a sum of the braking forces exerted on the wheels 91 to 94 is equal to or greater than the required braking force of the vehicle. This is an essential condition for braking the vehicle as required.

The distribution condition 2 is a condition in which a deviation between a sum of the braking forces of the left wheels 91, 93 (FL, RL.) in the front and rear rows and a sum of the braking forces of the right wheels 92, 94 (FR, RR) in the front and rear rows is within a predetermined range. By setting the deviation of the braking forces of the left and right wheels to be equal to or less than an upper limit value, for example, a vehicle deflection due to generation of a yaw moment at the time of straight-ahead braking can be suppressed. However, a situation in which the deviation of the braking force is zero is not always optimal. A condition may be set such that the deviation of the braking forces is equal to or greater than a lower limit value and equal to or less than the upper limit value when a difference between the braking forces of the left and right wheels is required to intentionally provide.

In S20, it is determined whether the vehicle 901 satisfies the exemption requirement. The exemption requirement may also be refereed to as an application exclusion requirement. An example of whether the exemption requirement is satisfied will be described with reference to the flowchart of FIG. 8. In this example, whether the exemption requirement is satisfied is sequentially determined in steps S21 to S23. It is determined that the exemption requirement is satisfied in S24 when an affirmative determination (YES) is made in at least one of S21 to S23.

In S21, it is determined whether a required braking force is less than an braking force threshold for exemption. In a region where the requested braking force is small, the current that flows when the lock current is applied is small, so the heat generation does not cause an undesirable situation. In S22, it is determined whether variation in the required braking force is greater than an exempted braking force variation threshold. If the affirmative determination (YES) is made in S22, the motor 60 rotates to change the pad position, so that the lock current supply state is not established in the first place.

In S23, it is determined whether the motor temperature Temp of the three-phase motor 60 is less than the exempted temperature threshold. Even if the lock current is applied, if there is a sufficient margin for the allowable upper limit temperature, there is no need to perform the up-down process.

In this way, in the situation where locking current is not applied in the first place or where heat generation in a specific phase does not cause an undesirable situation even if locking current is applied, it is determined in S24 that the vehicle 901 satisfies the exemption requirement. As a result, an affirmative determination (YES) is made in S20 of FIG. 7. Then, in S26, the braking force controller 40 does not execute the up-down process, but keeps the braking force command value constant at the reference value.

If a negative determination (NO) is made in S20, that is, except when the vehicle satisfies the exemption requirements, the braking force controller 40 starts the up-down process at the timing when the process start condition is established in S30. Examples of the process start timing include [1] to [4] shown in FIG. 9.

[1] The braking force controller 40 starts the up-down process at the same time as starting the energization control of the electric brakes 81 to 84.

[2] The braking force controller 40 starts the up-down process when the state in which the braking force command value exceeds a braking force threshold for beginning of processing (Br>Br_th_st) has elapsed for a waiting time Twt. The braking force threshold for beginning of processing is set to a value equal to or greater than the braking force threshold for exemption. It is preferable to provide a waiting time Twt in order to prevent erroneous determination due to the braking force temporarily exceeding the threshold value.

[3] When the state in which the variation amount of the braking force command value is less than the processing start braking force variation threshold (ΔBr<ΔBr_th) has elapsed for the waiting time Twt, the braking force controller 40 determines that the braking force is being maintained and starts the up-down process. The processing start braking force variation threshold is set to a value equal to or less than the exempted braking force variation threshold. It is preferable to provide a waiting time Twt in order to prevent erroneous determination due to temporary variations in the braking force.

[4] The braking force controller 40 starts the up-down process when the integrated power value supplied to the three-phase motor 60 exceeds the integrated power threshold (ΣP>ΣPth) or when the temperature of the three-phase motor 60 exceeds the temperature threshold for beginning of processing (Temp>Temp_th_st). The integrated power value ΣP is calculated by integrating the power from the start of the power supply control. For example, the integrated power value ΣPuvw for each phase may be calculated by adding up the integrated power values ΣPuvw for the three phases, or the maximum value of the integrated power values ΣPuvw for the three phases may be selected. The integrated power value ΣP reflects the motor temperature Temp. The temperature threshold for beginning of processing is set to a value equal to or greater than the exempted threshold temperature.

After starting the up-down process, in S40, the braking force controller 40 continues the up-down process within the increase/decrease range of the braking force command value that satisfies the above-mentioned distribution conditions 1 and 2 with respect to the distribution of the front-wheel braking force command value and the rear-wheel braking force command value.

Figure 10:
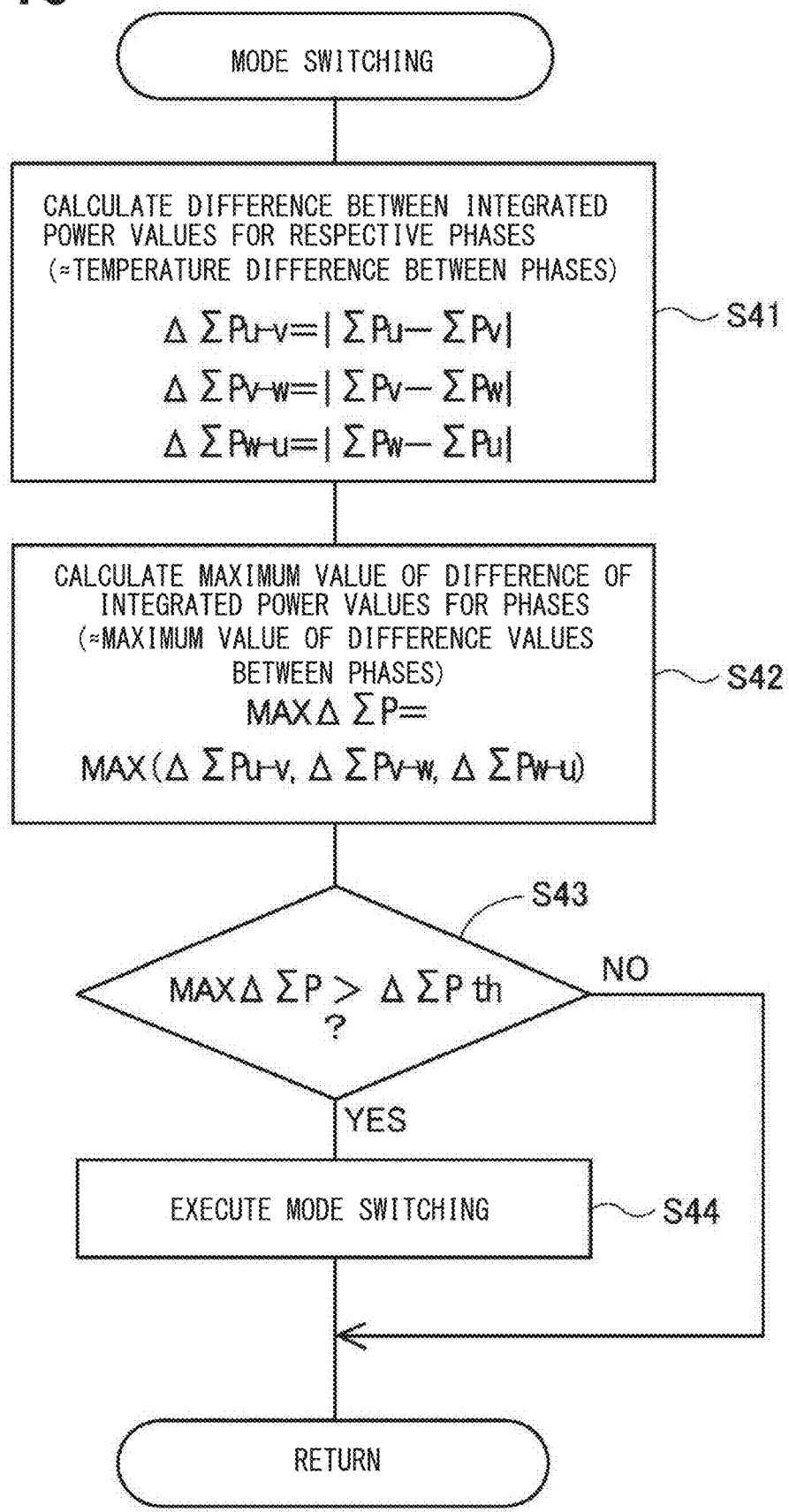
FIG. 10 is a flowchart of mode switching in the up-down process according to the second embodiment.

An example of a process of switching modes using the present value of a parameter as a trigger in the second embodiment will be described with reference to FIG. 10. The braking force controller 40 switches modes when the maximum value of the difference between the integrated power values supplied to each phase of the three-phase motor 60 exceeds an inter-phase integrated power difference threshold, or when the maximum value of the temperature difference between phases of the three-phase motor 60 exceeds an inter-phase temperature difference threshold.

In S41, the braking force controller 40 calculates the difference between the integrated power values of the respective phases using the equations (1.1) to (1.3). The difference between the integrated power values of the phases reflects the temperature difference between the phases of the three-phase motor 60.

$$\Delta \sum Pu - v = |\Delta \sum Pu - \Delta \sum Pv| \quad (1.1)$$

$$\Delta \sum Pv - w = |\Delta \sum Pv - \Delta \sum Pw| \quad (1.2)$$

$$\Delta \sum Pw - u = |\Delta \sum Pw - \Delta \sum Pu| \quad (1.3)$$

In S42, the braking force controller 40 calculates the maximum value of the differences between the integrated power values of the respective phases using equation (2). The maximum value of the difference between the integrated power values of the phases is a value that reflects the maximum value of the temperature difference between the phases of the three-phase motor 60.

$$MAX\Delta \sum P = MAX(\Delta \sum Pu - v, \Delta \sum Pv - w, \Delta \sum Pw - u) \quad (2)$$

In S43, it is determined whether the maximum value MAXΔΣP of the difference between the integrated power values of the phases exceeds the inter-phase integrated power difference threshold ΔΣPth (MAXΔΣP>ΔΣPth). If the determination result is affirmative (YES) in S43, the braking force controller 40 executes mode switching in S44. If the determination result is negative (NO) in S43, the process returns to S41 and the routine is repeated.

Modified Example of Second Embodiment

Figure 11:
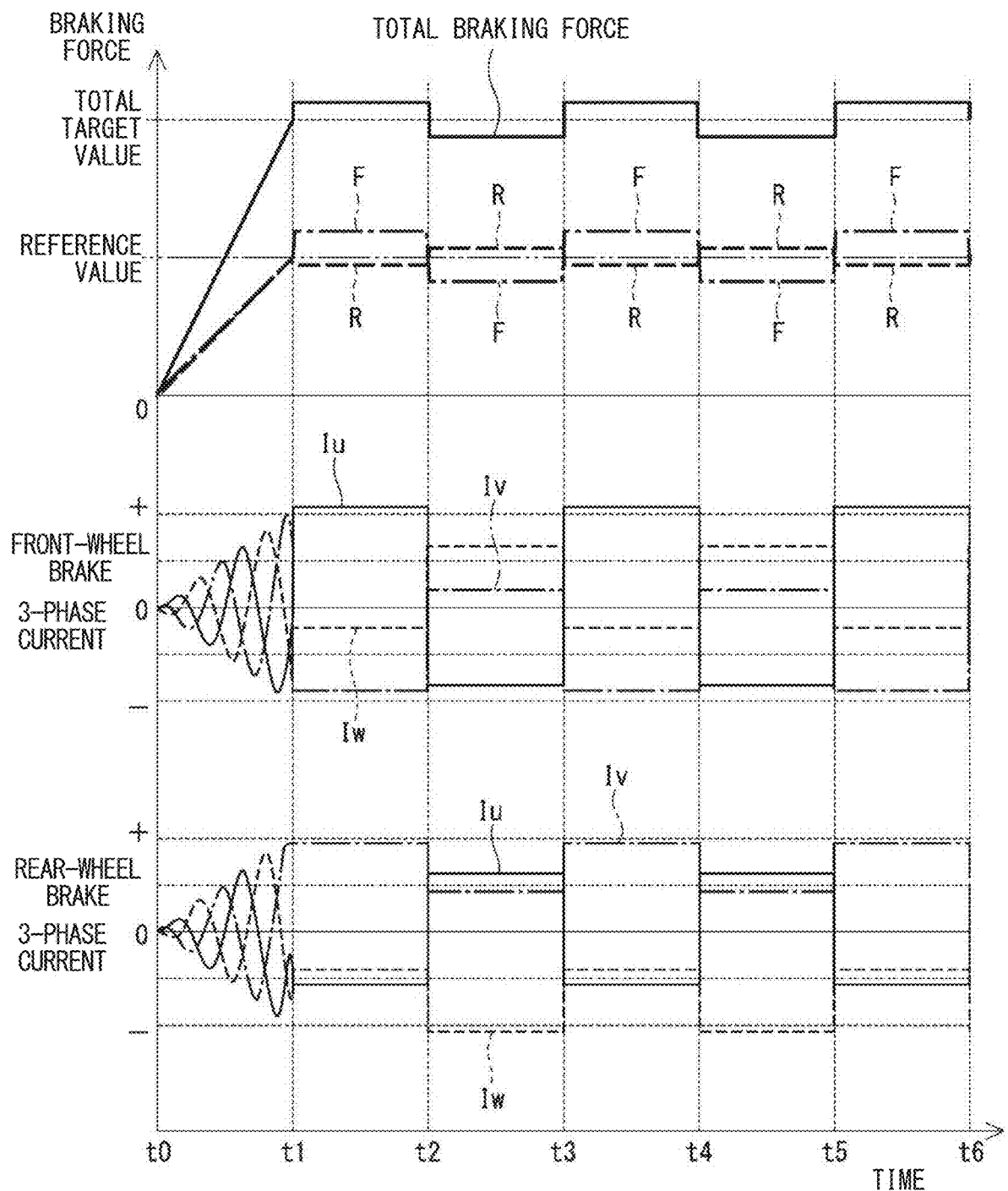
FIG. 11 is a time chart of a braking force command value in an up-down process and three-phase currents of a front-wheel brake and a rear-wheel brake in a first modified example of the second embodiment.
Figure 12:
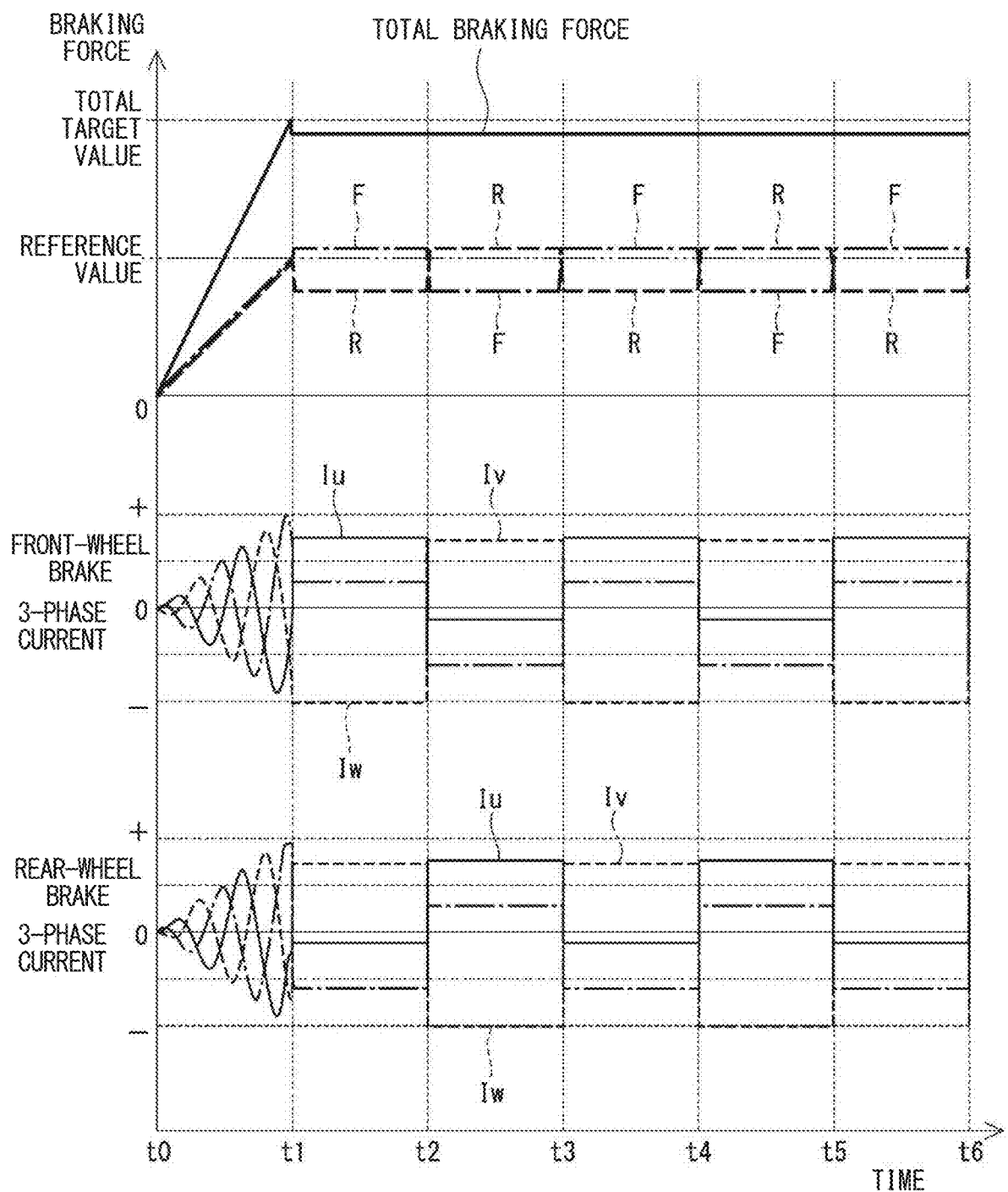
FIG. 12 is a time chart of a braking force command value in an up-down process and three-phase currents of a front-wheel brake and a rear-wheel brake in a second modified example of the second embodiment.

The following describes modified examples of the second embodiment with reference to FIGS. 11, 12. In the up-down process according to the second embodiment shown in FIG. 6, the increment on the positive side and the decrement on the negative side of the braking force command value with respect to the reference value are symmetrical. In the modified example, the increment and decrement of the braking force command value with respect to the reference value are asymmetric.

In the first modified example shown in FIG. 11, the increment or decrement of the front-wheel braking force command value is set to be larger than the increment or decrement of the rear-wheel braking force command value on both the positive and negative sides. As the front-wheel braking force command value increases or decreases, the total braking force also increases or decreases. In the second modified example shown in FIG. 12, the decrement of the braking force command value toward the negative side is set to be greater than the increment of the braking force command value toward the positive side for both the front and rear wheels. The total braking force is shifted toward the negative side from the total target value.

If the influence of the change in the total braking force on the vehicle behavior is within an allowable range, the braking force command values for the front and rear wheels may be changed asymmetrically with respect to the reference value in this manner. Therefore, it is possible to determine whether to execute the up-down process for each of the front and rear wheels. In other words, the control is simplified.

Third and Fourth Embodiments

Figure 13:
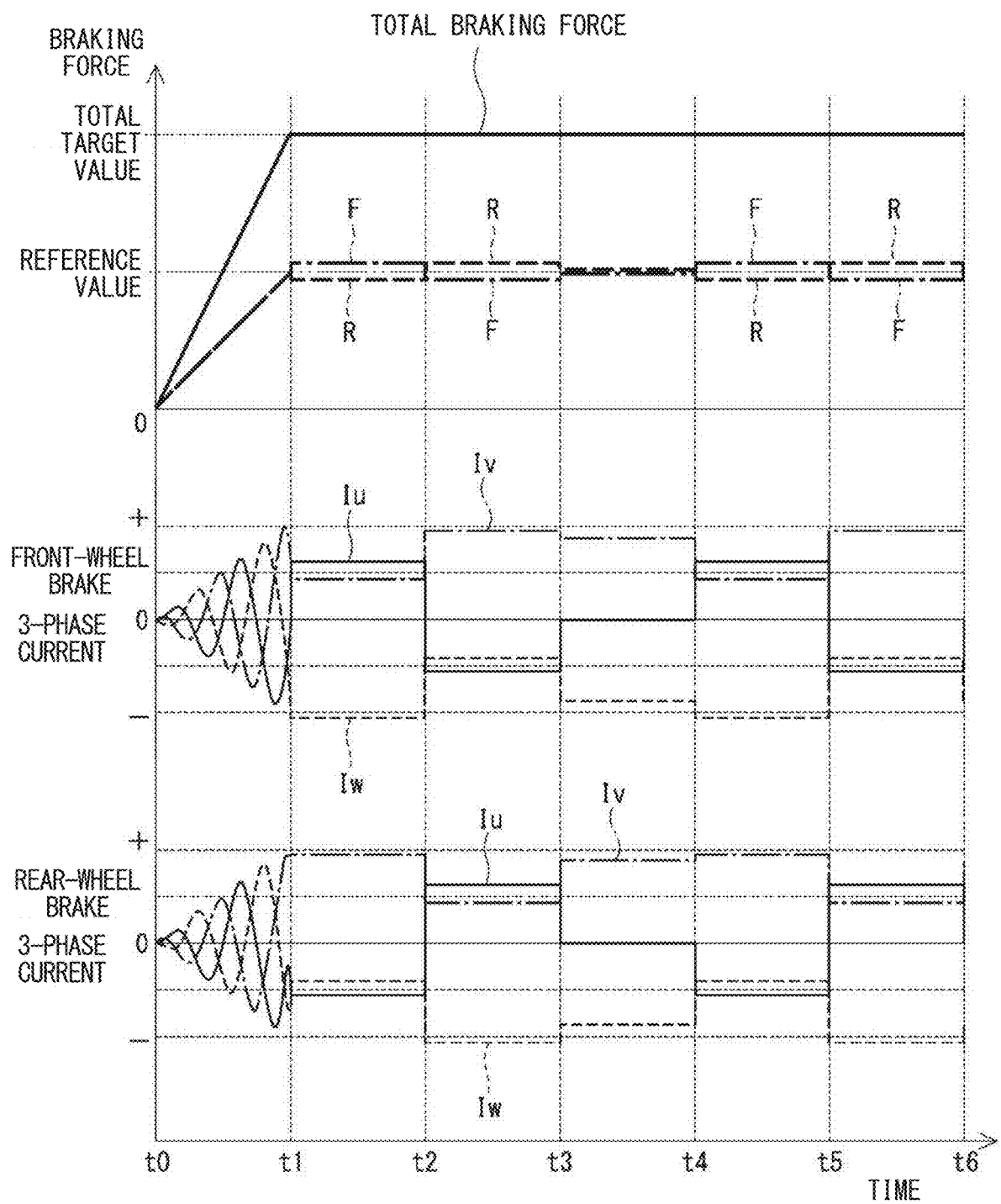
FIG. 13 is a time chart of a braking force command value in an up-down process and three-phase currents of a front-wheel brake and a rear-wheel brake in the third embodiment.
Figure 14:
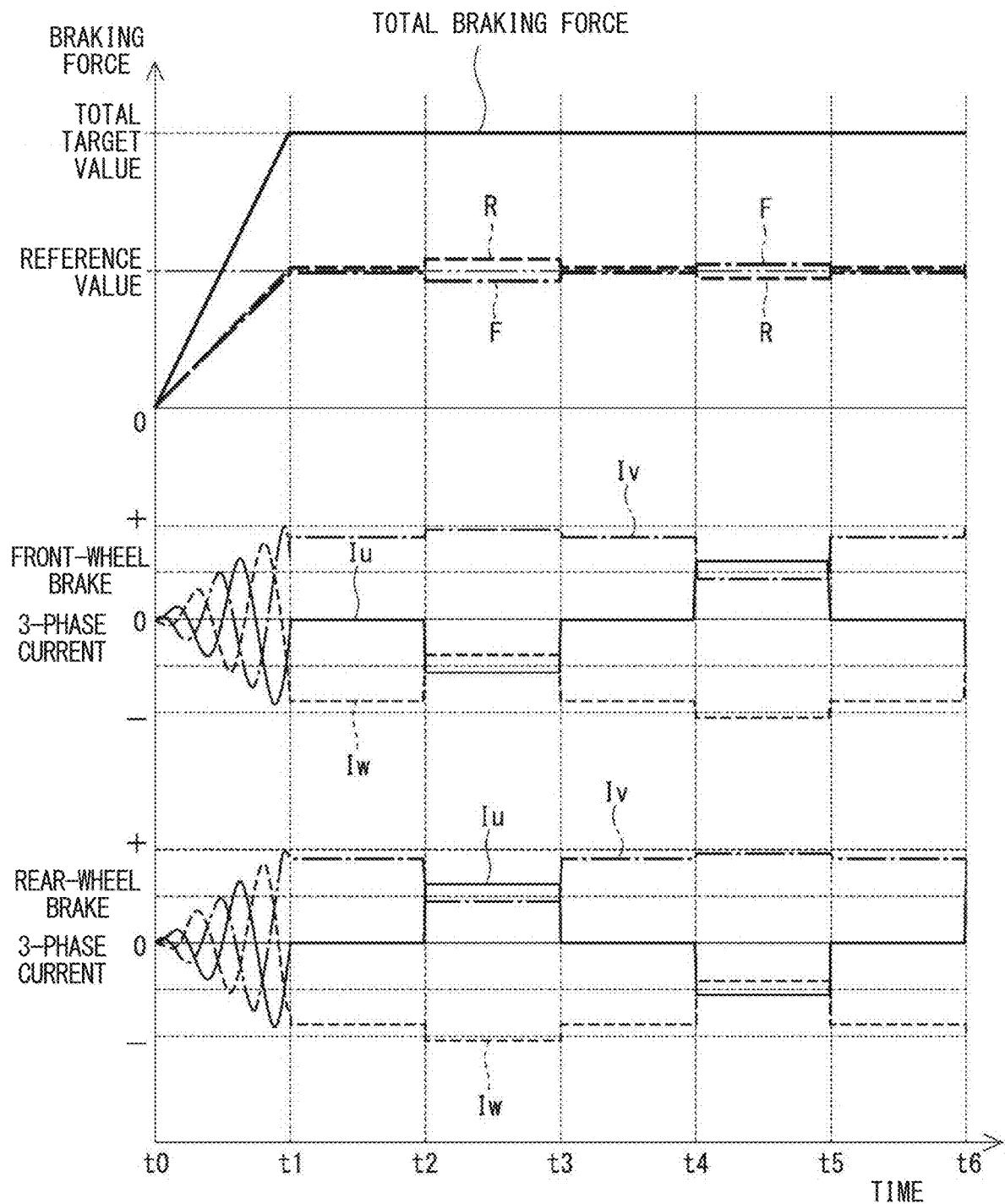
FIG. 14 is a time chart of a braking force command value in an up-down process and three-phase currents of a front-wheel brake and a rear-wheel brake in the fourth embodiment.

The up-down process described in the second embodiment is applied to the third and fourth embodiments with reference to FIGS. 13, 14, and an interval period is provided in the middle of a period in which the braking force command value is increased or decreased relative to a reference value. The interval period is a period during which the braking force command value is returned to and held at the reference value. In the second embodiment in which there is no interval period, a rectangular wave or a trapezoidal wave is continuously superimposed, whereas in the third and fourth embodiments, a rectangular wave or a trapezoidal wave is intermittently superimposed with an interval period therebetween. FIGS. 13, 14 illustrate that the increment of the braking force command value from the reference value and the decrement of the braking force command value from the reference value are set to be symmetrical. However, the increment and decrement may also be set to be asymmetrical as in the modified example of the second embodiment.

In the third embodiment shown in FIG. 13, one interval period is provided for every three terms of mode switching. If the change in the braking force during the interval period is represented as "0", then from time t1 to t6, the front-wheel braking force command value changes as "positive→negative→0→positive→negative," and the rear-wheel braking force command value changes as "negative→positive→0→negative→positive." The braking force command values for the front and rear wheels during the interval from time t3 to t4 are equal to the reference value. The total braking force command value is kept constant throughout times t1 to t6.

In the fourth embodiment shown in FIG. 14, one interval period is provided for every two terms of mode switching. From time t1 to time t6, the front-wheel braking force command value changes as "0→negative→0→positive→0", and the rear-wheel braking force command value changes as "0→positive→0→negative→0." The increment or decrement in the term from the time t2 to the time t3 is different from the increment and decrement in the term from the time t4 to t5. The braking force command values for the front and rear wheels in each of the interval periods t1 to t2, t3 to t4, and t5 to t6 are equal to the reference value. The total braking force command value is kept constant throughout times t1 to t6.

Fifth Embodiment

Figure 15:
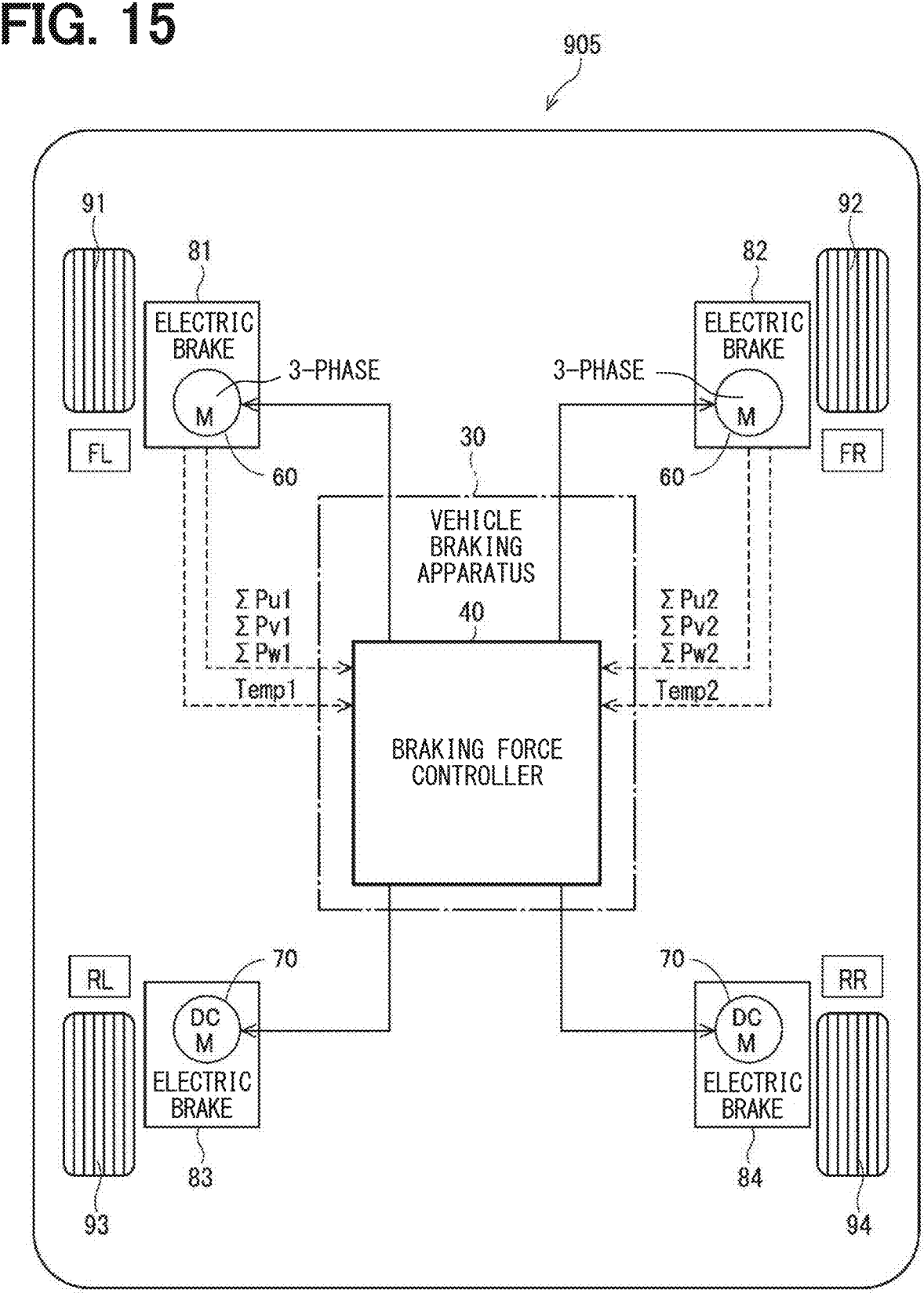
FIG. 15 is a diagram illustrating a configuration of a vehicle with which a vehicle braking apparatus related to a fifth embodiment is equipped.
Figure 16:
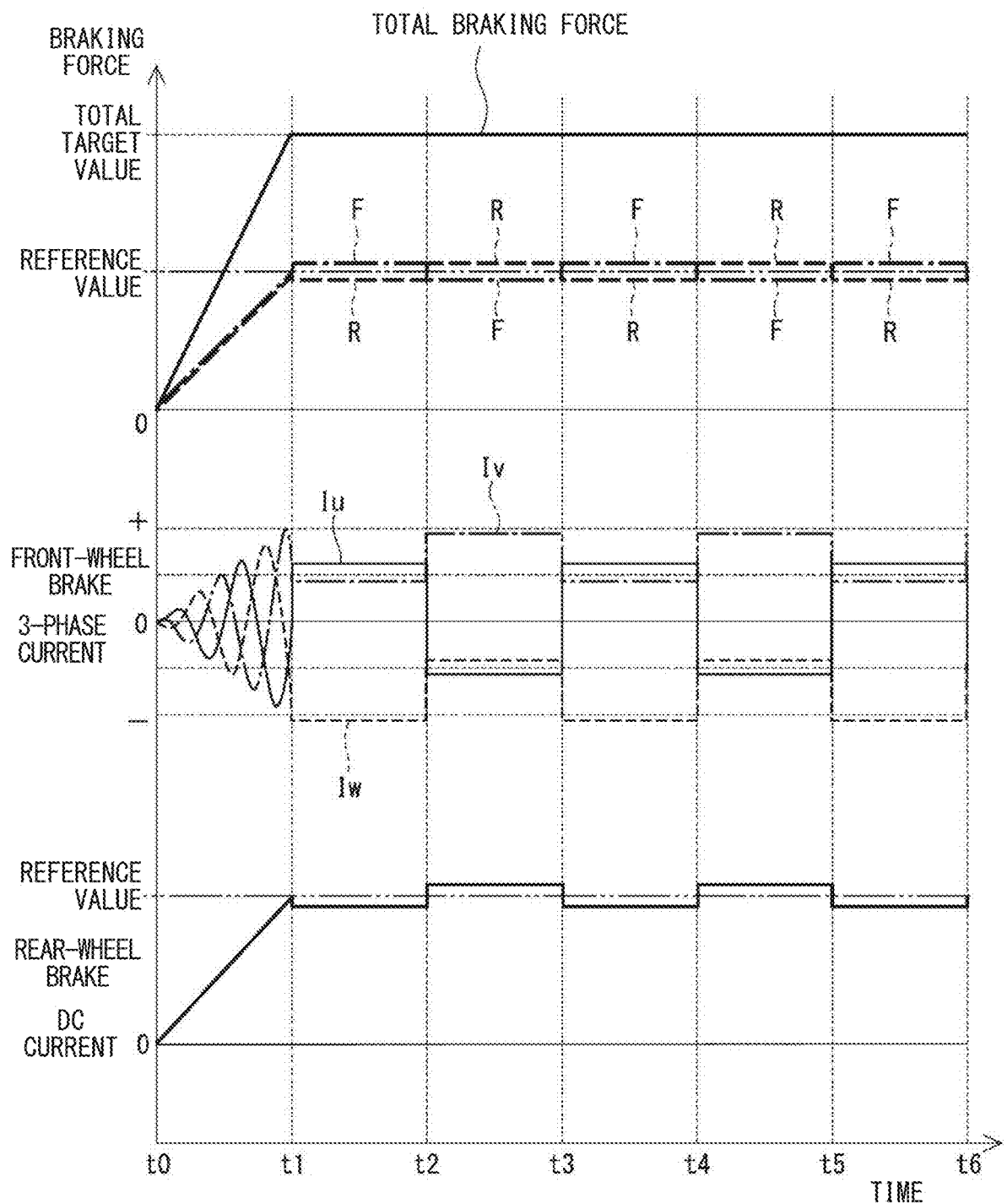
FIG. 16 is a time chart of a braking force command value in an up-down process and three-phase currents of a front-wheel brake and a rear-wheel brake in the fifth embodiment.

The following describes the fifth embodiment with reference to FIGS. 15, 16. As shown in FIG. 15, in a vehicle 905 to which the vehicle braking apparatus 30 is adapted, a pair of electric brakes 81, 82 corresponding to the front left and right wheels 91, 92 are three-phase motors 60. On the other hand, a pair of electric brakes 83, 84 corresponding to the left and right rear wheels 93, 94 are direct current motors 70. The direct current motor 70 may also be referred to as DCM in FIG. 15.

In this example, the front-wheel brakes 81, 82 are three-phase electric brakes, but the rear-wheel brakes 83, 84 are not three-phase electric brakes. Contrary to FIG. 15, the fifth embodiment includes a concept in which the front-wheel brakes 81, 82 are direct current motors 70 and the rear-wheel brakes 83, 84 are three-phase motors 60.

FIG. 16 shows an example of the up-down process in the fifth embodiment in a manner similar to that in the second embodiment. The change in the braking force command value relative to the reference value and the change in the three-phase currents of the front wheel brakes 81, 82 are the same as those in FIG. 6. The DC current of the rear-wheel brakes 83, 84 changes in proportion to the rear-wheel braking force command value.

The braking force controller 40 adjusts the DC current of the DC motors 70 of the rear wheel brakes 83, 84 as a complementary process for keeping the total braking force of the vehicle 905 constant in conjunction with the up-down process of the front-wheel brakes 81, 82. Since there is no point in avoiding current concentration in a specific phase in the DC motor 70, the rear-wheel brakes 83, 84 are not included in the direct targets of the up-down process.

OTHER EMBODIMENTS

In the above embodiment, the distribution of the braking force command values between the front-wheel brakes 81, 82 and the rear-wheel brakes 83, 84 varies due to the up-down process. In addition, the distribution of the braking force command value between the front left wheel brake 81 and the front right wheel brake 82, or between the rear left wheel brake 83 and the rear right wheel brake 84 may be varied.

The waveform superimposed on the braking force command value in the up-down process is not limited to a sine wave, a rectangular wave, or a trapezoidal wave, and may be another waveform.

The number of phases of a motor included in the electric brake is not limited to three, but may be four or more.

The present disclosure should not be limited to the embodiment described above. Various other embodiments may be implemented without departing from the scope of the present disclosure.

The braking force controller and method described in the present disclosure may be implemented by a special purpose computer which is configured with a memory and a processor programmed to execute one or more particular functions embodied in computer programs of the memory. Alternatively, the braking force controller described in the present disclosure and the method thereof may be realized by a dedicated computer configured as a processor with one or more dedicated hardware logic circuits. Alternatively, the braking force controller and method described in the present disclosure may be realized by one or more dedicated computer, which is configured as a combination of a processor and a memory, which are programmed to perform one or more functions, and a processor which is configured with one or more hardware logic circuits. The computer program may be stored in a computer-readable non-transitory tangible recording medium as an instruction to be executed by a computer.

The present disclosure has been made in accordance with the embodiments. However, the present disclosure is not limited to such embodiments and configurations. The present disclosure also encompasses various modifications and variations within the scope of equivalents. Furthermore, various combination and formation, and other combination and formation including one, more than one or less than one element may be made in the present disclosure.

What is claimed is:

1. A vehicle braking apparatus configured to be adapted to a four-wheel vehicle in which electric brakes are separately provided for wheels, the electric brakes configured to separately exert braking forces on the wheels, the vehicle braking apparatus comprising:
    a braking force controller configured to control the braking forces separately exerted by the electric brakes, wherein:
    the wheels include a front-left wheel, a front-right wheel, a rear-left wheel, and a rear-right wheel;
    the electric brakes include
        a first pair of electric brakes provided for the front-left wheel and the front-right wheel, and a second pair of electric brakes provided for the rear-left wheel and the rear-right wheel;

at least one pair of the first pair of electric brakes or the second pair of electric brakes are multiphase electric brakes, and each of the multiphase electric brakes includes a multiphase motor having three or more phases;

the braking force controller is further configured to execute an up-down process to prevent a current from being concentrated on a particular phase of the multiphase motor while the braking force controller maintaining the braking forces, except when the vehicle satisfies a predetermined exemption condition; and the up-down process is a process in which the braking force controller increases and decreases a braking force command value for the multiphase electric brakes from a reference value of the braking force command value.

2. The vehicle braking apparatus according to claim 1, wherein the first pair of electric brakes and the second pair of electric brakes are the multiphase electric brakes.

3. The vehicle braking apparatus according to claim 1, wherein the braking force controller is configured to execute the up-down process by superimposing a sine wave of the braking force command value on the reference value of the braking force command value for the multiphase electric brakes.

4. The vehicle braking apparatus according to claim 1, wherein:

the braking force controller is further configured to execute the up-down process by superimposing a rectangular wave or a trapezoidal wave of the braking force command value on the reference value of the braking force command value continuously or intermittently for the multiphase electric brakes;

the rectangular wave or the trapezoidal wave has a waveform that alternates between a positive state and a negative state; and the positive state is a state in which a value of the waveform exceeds the reference value, and the negative state is a state in which the value of the waveform falls below the reference value.

5. The vehicle braking apparatus according to claim 4, wherein the braking force controller is further configured to execute the up-down process by switching a mode being the positive state or the negative state with respect to the reference value at a predetermined fixed period.

6. The vehicle braking apparatus according to claim 4, wherein:

the braking force controller is further configured to execute the up-down process by switching a mode being the positive state or the negative state with respect to the reference value, based on a condition that a maximum difference in integrated power values separately provided for phases of the multiphase motor exceeds an integrated power difference threshold, or a maximum temperature difference between the phases of the multiphase motor exceeds an interphase temperature difference threshold.

7. The vehicle braking apparatus according to claim 1, wherein the braking force controller is further configured to start energization control of the multiphase electric brakes and start the up-down process at same time, except when the vehicle satisfies the predetermined exemption condition.

8. The vehicle braking apparatus according to claim 1, wherein:

the braking force controller is further configured to start the up-down process based on a condition that a first state or a second state has elapsed for a waiting time, except when the vehicle satisfies the predetermined exemption condition; and the first state is a state in which the braking force command value exceeds a braking force threshold for beginning of processing, and the second state is a state in which variation in the braking force command value falls below a braking force variation threshold for beginning of processing.

9. The vehicle braking apparatus according to claim 1, wherein, except when the vehicle satisfies the predetermined exemption condition, the braking force controller is further configured to start the up-down process based on a condition that:

an integrated power value provided for the multiphase motor exceeds an integrated power threshold; or a temperature of the multiphase motor exceeds a temperature threshold for beginning of processing.

10. The vehicle braking apparatus according to claim 1, wherein:

the braking force controller is further configured to execute braking force distribution for the wheels to ensure that sum of the braking forces separately exerted on the wheels is larger than or equal to a requested braking force of the vehicle.

11. The vehicle braking apparatus according to claim 10, wherein:

the braking force controller is further configured to execute the braking force distribution for the wheels to ensure that deviation between first sum and second sum is within a predetermined range; and the first sum is sum of braking forces separately exerted on the front-left wheel and the rear-left wheel of the four-wheel vehicle, and the second sum is sum of braking forces separately exerted on the front-right wheel and the rear-right wheel of the four-wheel vehicle.

12. The vehicle braking apparatus according to claim 1, wherein:

the predetermined exemption condition includes a first condition in which a requested braking force of the vehicle is smaller than a braking force threshold for exemption, a second condition in which variation in the requested braking force of the vehicle is larger than a braking force variation threshold for exemption, and a third condition in which a temperature of the multiphase motor is lower than a temperature threshold for exemption; and the braking force controller is further configured to maintain the braking force command value at the reference value without executing the up-down process, based on a condition that the vehicle satisfies at least one of the first condition, the second condition, or the third condition.

* * * * *